Dec. 20, 1966 D. SCARAMUCCI 3,292,658
CHECK VALVE AND RESILIENT HINGE STRUCTURE
AND METHOD FOR MANUFACTURING SAME
Filed July 15, 1963 3 Sheets-Sheet 1

INVENTOR.
DOMER SCARAMUCCI
BY
Dunlap, Laney & Hubbard
ATTORNEYS

Dec. 20, 1966  D. SCARAMUCCI  3,292,658
CHECK VALVE AND RESILIENT HINGE STRUCTURE
AND METHOD FOR MANUFACTURING SAME
Filed July 15, 1963  3 Sheets-Sheet 2

INVENTOR.
DOMER SCARAMUCCI
BY
Dunlap, Laney & Hubbard
ATTORNEYS

Dec. 20, 1966  D. SCARAMUCCI  3,292,658
CHECK VALVE AND RESILIENT HINGE STRUCTURE
AND METHOD FOR MANUFACTURING SAME
Filed July 15, 1963  3 Sheets-Sheet 3

INVENTOR.
DOMER SCARAMUCCI
BY
Dunlap, Laney & Hubbard
ATTORNEYS

United States Patent Office 3,292,658
Patented Dec. 20, 1966

3,292,658
CHECK VALVE AND RESILIENT HINGE STRUCTURE AND METHOD FOR MANUFACTURING SAME
Domer Scaramucci, P.O. Box 9125,
Oklahoma City, Okla. 73102
Filed July 15, 1963, Ser. No. 294,875
12 Claims. (Cl. 137—525.3)

The present invention relates to valves, and more particularly, but not by way of limitation, relates to improvements in valves known in the art as flapper, clapper, or swinging type check valves. The present invention also contemplates a novel resilient hinge structure and a novel sealing lip means specially adapted for use in the check valve, and to a novel method for manufacturing the improved check valve and its novel components.

Check valves are of course well known in the art and are used to permit fluid flow in the forward direction through a conduit while blocking flow in the other, or reverse, direction. One well known type of check valve is comprised generally of an annular seat formed within a housing. A valve member is in most cases pivotally connected to the housing at one side of the valve member so that the valve member will swing away from the seat responsive to fluid flow in the forward direction, and will swing back into sealing engagement with the seat to block reverse flow.

Most of the check valves of this type employ relatively complicated housings, seat and valve member construction and are relatively expensive to manufacture. Further, a large number of devices have been proposed and used for connecting the swinging valve member to the housing, but by and large these devices may be categorically described as employing a metallic hinge structure which is subject to friction, wear and, of course, binding due to lodging of foreign particles between the relatively moving surfaces of the hinge. In many cases a spring device is used in combination with the hinge to bias or urge the valve member against the annular seat and thereby promote proper operation of the valve.

Some swinging check valves have employed rubber or other resilient material to act both as a hinge and a spring tending to return the valve member to the seat. By and large, these valves have been substantially limited to low pressures and to situations in which the hinge means is not subjected to repeated or excessive flexure. These valves have, as a whole, proven unsatisfactory and have not been used under rugged conditions of high pressure and high flow velocities, particularly where abrasive materials are entrained in the fluids, or in situations where a long service life is demanded. In a few instances, very simple check valves suitable for low pressures and minimum adverse conditions have been manufactured by molding both the valve member and seat as an integral unit and then cutting the valve member away from the seat. However, attempts to manufacture more sophisticated valves in this manner have proven unsatisfactory because the hinge structure fails under repeated use at the point where the severance between the valve member and the seat is terminated. Further, considerable problems are encountered in obtaining an adequate seal between the surfaces formed by the severance between the valve member and seat.

The present invention contemplates an improved check valve construction utilizing an improved resilient hinge structure having a long service life and an improved sealing means for effectively holding both high and low pressures, and further contemplates a novel method for economically manufacturing the valve, hinge structure, and sealing means.

Therefore, it is an object of the present invention to provide an improved swinging type check valve.

Another object of the present invention is to provide an improved valve construction having a minimum of parts which can be very economically manufactured and easily assembled.

Another object of this invention is to provide an improved resilient hinge-spring construction having a long service life even when subjected to repeated maximum flexure.

Yet another object of the invention is to provide an improved fluid responsive sealing means between a valve member and seat.

Still another object of the present invention is to provide a valve of the type described having metallic or other substantially rigid reinforcing elements for withstanding high pressures, yet which has a resilient sealing means for both low and high pressures so that no precision metal seating surfaces are required.

Still another object of the present invention is to provide a novel means for connecting an integrally molded resilient hinge and valve member structure to a tubular valve seat.

Another object of the present invention is to provide an improved hinge structure particularly adapted for a check valve of the type described which will more accurately guide the valve member onto the seat.

Still another object of the present invention is to provide an improved hinge structure of the type described which will also function as a spring to urge the valve member toward the seat.

A still further object of the present invention is to provide a hinge structure of the type described which will have an exceedingly long service life.

Yet another object of the present invention is to provide a method for economically manufacturing the hinge structure.

Still another object of the present invention is to provide an improved method for economically manufacturing check valves of the type described.

A still further object of the present invention is to provide a check valve of the type described which will effectively withstand and hold relatively high pressures.

A still further object of the present invention is to provide a check valve of the type described which will provide a fluid tight seal even under relatively low operating pressures.

Yet another object of the present invention is to provide a check valve of the type described in which the valve member may be easily and quickly replaced without disconnecting the valve housing from the fluid conduit.

Many additional objects and advantages of the present invention will be evident to those skilled in the art from the following detailed description and drawings, wherein:

FIG. 10 is a longitudinal, partial sectional view of yet another valving device constructed in accordance with the present invention, the device being shown in closed position, but not pressure loaded;

FIG. 10a is a longitudinal, partial sectional view of the valving device of FIG. 10 illustrating the device when pressure loaded;

FIG. 12 is a longitudinal sectional view of still another valving device constructed in accordance with the present invention, the device being shown in closed, but not pressure loaded, position;

FIG. 12a is a partial longitudinal sectional view of the device of FIG. 12 illustrating the device in closed, pressure loaded, position;

FIG. 13 is a longitudinal sectional view of the valving device of FIG. 12 at an intermediate stage of manufacture and serves to illustrate the method of the present invention;

FIG. 14 is a longitudinal sectional view of another valve constructed in accordance with the present invention, the device being shown in closed, but not pressure loaded, position;

FIG. 15 is a top view of the valve illustrated in FIG. 14 with the retaining plug removed to reveal details of construction; and, FIG. 16 is a longitudinal sectional view of the valve member and hinge-spring means of the valve illustrated in FIG. 14, in relaxed position.

Figure 1:
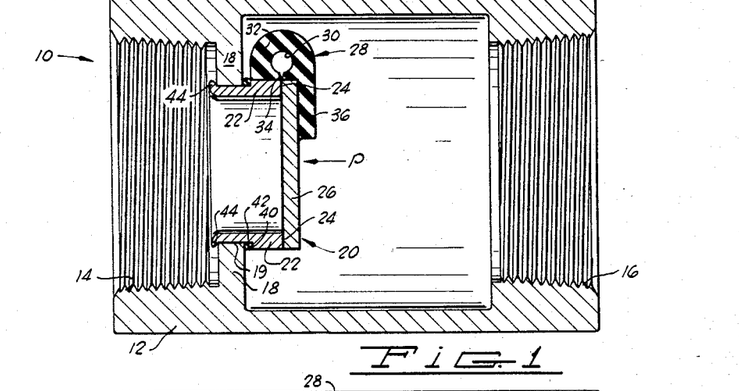
FIG. 1 is a longitudinal sectional view through a valve constructed in accordance with the present invention, the valve being illustrated in the closed position.
Figure 2:
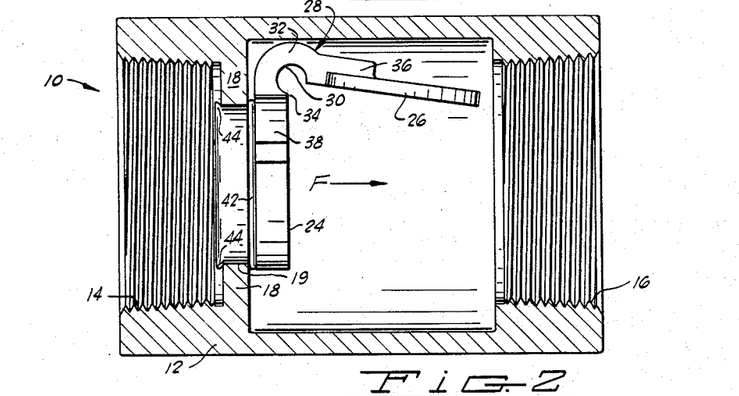
FIG. 2 is a longitudinal sectional view of the valve of FIG. 1 with the valve in the open position.
Figure 3:
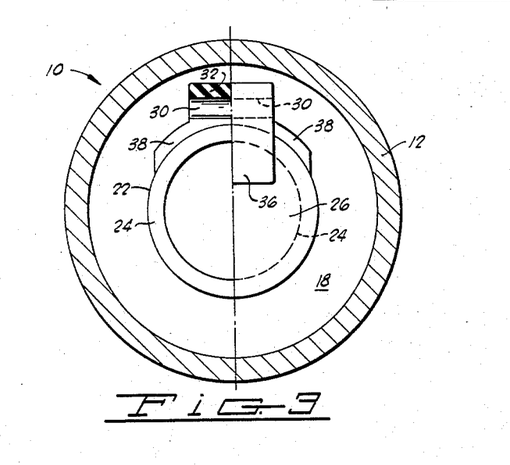
FIG. 3 is a sectional view taken substantially on lines 3—3 of FIG. 1 with the left-hand half of the valve member and resilient hinge-spring means broken away to better illustrate the details of construction.

Referring now to the drawings, and in particular to FIGS. 1–3, a valve constructed in accordance with the present invention is indicated generally by the reference numeral 10. The valve 10 is comprised of a generally tubular housing 12 having internal threads 14 and 16 at the inlet and outlet ends, respectively, for connecting the valve in a standard fluid conduit. An annular shoulder 18 projects radially inwardly to form a circular aperture 19 which receives a valving device indicated generally by the reference numeral 20.

The valving device 20 is comprised of a tubular seat member 22 which is received within the aperture 19 formed by the annular shoulder 18. An annular seating surface 24 is formed on the downstream end of the seat member 22 and, as illustrated, lies in a plane disposed normal to the longitudinal axis of the tubular seat member 22, although it will be appreciated that the seating surface need not necessarily lie wholly within a plane and need not be disposed normal to the axis. A disc-shaped valve member 26 is adapted to sealingly engage the annular seating surface 24 of the seat member 22 to form a fluid tight seal and prevent the reverse fluid flow, as will presently be described.

The valve member 26 is connected to the seat member 22 by a novel hinge-spring means constructed in accordance with the present invention and indicated generally by the reference numeral 28. The hinge spring means 28 may be fabricated from rubber, synthetic rubber, synthetic plastic or any one of the many synthetic resilient materials which are presently available in the art. These materials will hereafter be generally referred to as resilient material, rubber or synthetic rubber. The hinge-spring means 28 is particularly characterized by an elongated bore 30 which extends completely through the mass of resilient material from which the hinge-spring means is fabricated. The bore is disposed parallel to a tangent to the tubular seat member 22 and lies generally within the plane of the annular seat 24 and therefore within the plane of separation between the valve member 26 and seat member 22. This configuration forms a generally tubular portion 32 around the bore 30 which is split or separated along one side to form a severance plane 34 extending the length of the bore 30. The tubular portion 32 is connected to the valve member 26 by a strap portion 36, one half of which can be seen in FIG. 3, and to the seat member 22 by a semicircular band, as can best be seen in FIGS. 2 and 3. Thus it will be noted that the tubular portion 32 is connected on opposite sides of the severance plane 34 to the valve member 26 and to the seat member 22.

The seat member 22 is provided with an annular shoulder 40 against which an annular resilient sealing means 42 is positioned. The end of the tubular seat member 22 opposite the annular seat 24 is then inserted through the aperture 19 formed by the annular shoulder 18 until the sealing means 42 abuts the downstream face of the shoulder 18 and then the upstream end is flared outwardly or crimped at several points 44 in order to retain the seat member and therefore the valving device 20 in place in the housing 12.

The general operation of the valve 10 is conventional. When fluid flows in the forward direction of the arrow F in FIG. 2, the valve member 26 will swing upwardly through a substantially circular arc to the position illustrated and fluid will flow through the valve. The hinge-spring means 28 will be flexed to the position illustrated in FIG. 2. However, due to the shape of the tubular portion 32 as formed by the bore 30, the internal stresses within the resilient material from which the hinge-spring means is fabricated will be kept at a very low value so that repeated opening and closing of the valve member 26 will not result in failure due to fatigue of the resilient material. Also, the portion of the hinge means 28 which is placed under tension, i.e., the portion of the material adjacent the elongated bore 30, is remote from the flow of fluid through the seat member 22 so that abrasion of the resilient material while under tension is substantially reduced. As the flow of fluid through the seat member 22 subsides, the tension within the flexed tubular portion 32 of the hinge-spring means 28 will tend to urge the valve member 26 toward the annular seat 24. At the same time, the hinge-spring means accurately guides the valve member 26 onto the seat 24 due to the length of the tubular portion 32 which is the dimension illustrated in FIG. 3. As illustrated, the valve member 26 and seat 24 are metal so that a machined, metal-to-metal seal is necessary. Of course, it will be appreciated that various resilient sealing means can be provided on either the annular seat 24 or valve member 26 and in particular, the novel sealing means hereafter described may be provided. When flow tries to reverse and pressure is applied to the valve member 26 in the reverse direction indicated by the arrow P in FIG. 1, it will be appreciated that the resulting force on the seating member 22 will compress the sealing means 42 between the shoulder 40 and the shoulder 18 to augment sealing between the valving device 20 and the housing 12. On the other hand, very little force is applied to the seating member 22 when fluid is flowing in the forward direction of arrow F, as illustrated in FIG. 2, so that the flare 44 may be very slight and in the nature of a few spaced crimps. Or, the seat member 22 may be secured in the annular shoulder 18 by a permanent press fit or by threads, as will hereafter be described in greater detail. However, either the flared or press fit connections are preferred over the threaded connection because a mark indicating the top of the valve can be placed on the outside of the housing and the valving device easily inserted with the hinge-spring means on top to attain the best operating position. Nevertheless, it is to be understood that due to the springing character of the resilient material, the valve will operate in an inverted position.

An important aspect of the valve 10 and of the invention is the economical method by which the valve 10 and in particular the hinge-spring means 28 may be manufactured. Of course the housing 12, the seating member 22, and the valve member 26 are all machined to their completed forms except for the flared end 44 on the seating member 22. Then the valve member 26 is placed in seated position on the annular seat 24 and the two members inserted in a mold for forming the hinge means 28. Next the resilient material is introduced and cured in the mold and at the same time bonded to the valve member 26 and seating member 22. The bore 30 is preferably molded in the resilient material but can be formed by cutting the material away. Then the resilient material is slit along the severance plane 34 to complete the hinge-spring means 28. It is also desirable to mold the annular sealing means 42 and bond it to the seating member 22 during the molding of the hinge-spring means. Next the valving means 20 is inserted in the aperture 19 formed by the annular shoulder 18 and the end of the seat member 22 flared as at 44 or the seat member otherwise secured in place. Construction of the valve 10 is then complete. It will also be appreciated that the hinge-spring means 28 may be first molded apart from the valve member 26 and seat member 22, and then bonded to the valve and seat members by a suitable cement or other bonding agent. Similarly, it will be apparent that the severance plane 34 can be formed during the molding process if desired.

Figures 4, 9:
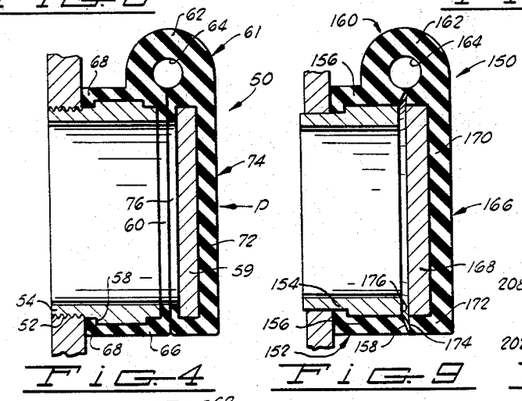
FIG. 4 is a longitudinal view of another valve device constructed in accordance with the present invention, the valve being shown in the closed position, but not pressure loaded.
FIG. 9 is a longitudinal, partial sectional view of a valving device constructed in accordance with the present invention, the valve being shown in closed position, but not pressure loaded.
Figure 5:
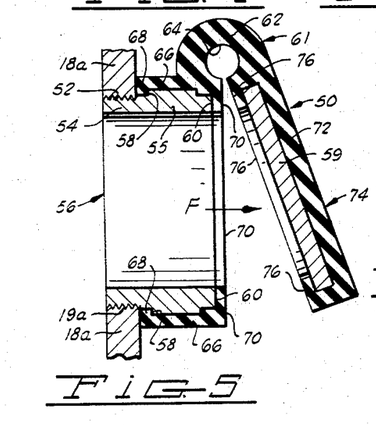
FIG. 5 is a longitudinal sectional view of the valve of FIG. 4 illustrating the valve in the open position.

Referring now to FIGS. 4 and 5, another valving device constructed in accordance with the present invention is indicated generally by the reference numeral 50. The valving device 50 is similar in operation to the valving device 20 and may be used in a housing similar to the housing 12 having a radially inwardly directed annular shoulder 18a corresponding to the shoulder 18 and forming an aperture 19a. However, the aperture 19a formed by the shoulder 18a is provided with threads 52 which receive the threaded end 54 of a tubular reinforcing member 55 which taken in combination with resilient material presently to be described forms a tubular seat member indicated generally by the reference numeral 56. The outside diameter of a portion of the tubular reinforcing member 55 may be larger than the diameter of the threaded portion 54 to provide an annular shoulder 58. A disc-shaped reinforcing plate 59 has a diameter corresponding generally to the diameter of the downstream end 60 of the tubular reinforcing member 55.

A hinge-spring means indicated generally by the reference numeral 61 is comprised of a body of resilient material such as synthetic rubber or other substantially equivalent resilient material, which substantially encompasses and preferably is bonded to the tubular reinforcing member 55 and the reinforcing valve member plate 59. As previously described in connection with the hinge means 28, the hinge-spring means 61 is also comprised of a tubular portion 62 formed by an elongated bore 64 which extends through the body of resilient material in substantially the same relationship to the plane of the annular seating surface, as will hereafter be described. The body of resilient material includes a portion 66 which extends completely around the tubular reinforcing member 55. A portion of the resilient material also extends over the annular shoulder 58 to form an annular sealing means 68 between the shoulder 58 and the downstream face of the annular shoulder 18a, and a portion of the resilient material extends over the downstream end 60 of the tubular reinforcing member 55 and forms an annular resilient seating surface 70 for the seat member 56. Another portion 72 substantially encompasses the reinforcing plate 59 and in combination with the plate forms a valve member indicated generally by the reference numeral 74. The resilient material extends around the edges of the plate 59 and covers the peripheral portion of the innermost or upstream face to form an annular seating surface 76 which is adapted to mate with the annular seating surface 70 of the seating member 56.

The operation of the valving device 50 is substantially identical to the operation of the valving device 20, except for the operation of the resilient annular seating surfaces 70 and 76 of the seat member 56 and valve member 74, respectively. Thus when fluid flows in the direction of the arrow F, the valve member 74 will swing away from the seating surface 70 as the tubular portion 62 flexes, as previously described in connection with the valve 10. As the flow descreases, the resiliency of the tubular portion 62 tends to urge the valve member 74 toward the seating surface 70. When a back pressure is applied on the valve member 74 in the direction of the arrow P in FIG. 4, the resulting force will press the resilient seating surface 76 firmly against the seating surface 70 on the seat member 56 to provide a fluid tight seal.

While this construction provides a very economical and quietly operating check valve having a long service life, it is not outstandingly effective at low pressures because the resilient seating surfaces 70 and 76 are not fluid responsive, as hereafter defined in greater detail, but seal only as a result of compression. Further, this type of seal between the valve member and seat member is subject to deterioration when subjected to very high back pressures because the great force tends to extrude the resilient material from between the plate 59 and the end 60 of the reinforcing member 55, The valving device 50 may be economically manufactured in accordance with the method of the present invention. After the tubular reinforcing member 55 and reinforcing plate 59 have been machined, the two are placed in a mold in substantially the spaced positions illustrated in FIG. 4. This may easily be accomplished by inserting a cylindrical core in the tubular seating member 56 to support the plate 59 in the properly spaced position. The mass of resilient material is then cured as a single unit substantially in the shape illustrated. The bore 64 may conveniently be formed during the molding process by a simple cylindrical pin or may be formed by boring the material either before or after the mold is removed. Next, a thin cutting tool is used to separate the mass of material between the end 60 of the reinforcing member 55 and the reinforcing plate 59 to form the seating surfaces 70 and 76. The valving device may then be threaded into the annular shoulder 18a of the housing as illustrated in FIG. 5, or may be inserted and flared as was done in the case of the valve 10, or may be secured in place by a permanent press fit, or any other suitable manner. In any event, the portion of the body of material forming the annular sealing means 68 will provide both a compression type seal and a fluid responsive seal between the seat member 56 and the annular shoulder 18a to withstand any back pressure placed on the valving device.

Figures 6A, 6B:
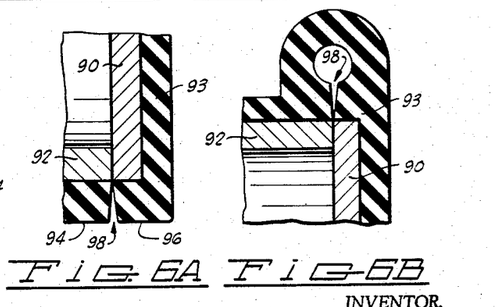
FIGS. 6a and 6b, taken together, provide a schematic illustration of a problem encountered during development of this invention which has been overcome by the novel method of the present invention.

The valve 10 previously described employs a metal-to-metal pressure type seal, while the valving device 50 employs a resilient compression type seal. Neither of these seals will function reliably at very low pressures and under conditions where an absolute seal is desired. It is known that so-called pressure responsive or pressure augmented seals employing a resilient sealing means which is deformed by pressure into a sealing engagement are more efficient at lower pressures and in most cases at higher pressures. However, this type of seal has heretofore required a more complicated and more costly construction. Further, the resilient materials or rubber from which the hinge-spring means is fabricated in accordance with the present invention exhibit a characteristic which creates problems in readily manufacturing the valving devices employing pressure responsive seals, as will presently be described. For example, if a substantially rigid reinforcing plate 90 is positioned adjacent the end of a substantially rigid tubular reinforcing member 92, as illustrated in the broken view of FIGS. 6a and 6b, and a mass of rubber or other resilient material molded around and bonded to the reinforcing members, the rubber along the outer surfaces 94 and 96 will shrink an infinitesimal amount upon curing so that when the resilient material is severed along the plane of contact between the reinforcing plate 90 and the reinforcing member 92, the outer portions of the rubber will pull apart to form a gap 98 extending completely around the periphery of the reinforcing member 92. Thus the resilient material 93 will not be compressively engaged upon closure of the valve member against the seat member to form a seal. Further, in most cases, the rubber will spread sufficiently far apart that as the fluid passes through the opening 98, it will not attain a sufficient velocity to decrease the pressure within the gap enough that the higher pressure acting upon the surfaces 94 and 96 will cause the resilient material to flow into the gap 98 and effect a so-called pressure responsive fluid seal. Therefore, a valving means constructed in this manner will, in nearly all cases, fail to effect a fluid tight seat. The valving devices shown in FIGS. 7, 8, 9, 10 and 11 overcome this difficulty and can be easily and economically manufactured in accordance with the method of the present invention, as will hereafter be described.

Figure 7:
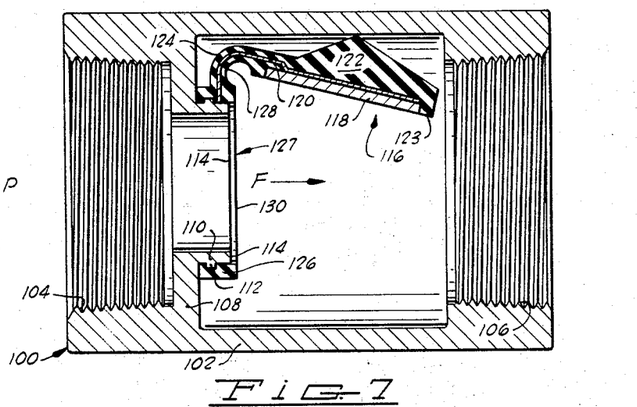
FIG. 7 is a longitudinal sectional view of another valve constructed in accordance with the present invention, the valve being illustrated in the open position.

Referring now to FIG. 7, another valving device constructed in accordance with the present invention is indicated generally by the reference numeral 100. The device 100 is comprised of a tubular housing 102 which is substantially identical to the housing 12 of the valve 10 and has internal threads 104 and 106 at the inlet and outlet ends, respectively, for connecting the valve in a standard fluid conduit. Of course, it will be appreciated that any standard coupling means for connecting the valve in a conduit may be provided in place of the internal threads. The housing 102 also has a radially inwardly extending annular shoulder 108 having a tubular reinforcing portion 110 which, as illustrated, is formed integrally with the shoulder at the innermost edge thereof. The reinforcing portion 110 has a peripheral retaining lip 112 and a downstream end 114 for ultimately engaging and holding a pressure loaded valve member 116, as will presently be described.

A valve member 116 is comprised of a disc-shaped reinforcing plate 118 having a diameter corresponding essentially to the reinforcing portion 110. A sheet of reinforcing material 120 is imbedded within a mass of resilient material 122 which is bonded to the reinforcing plate 118. A peripheral ring portion 123 encompasses the plate 118 and the two components form the valve member 116. The resilient material 122 also forms a hinge-spring means 124 of the type previously described and an annular elastic band 126 for connecting the hinge-spring means 124 to the reinforcing member 110. The reinforcing member 110 and elastic band together form a tubular seat member indicated generally by the reference numeral 127 which will hereafter be described in greater detail. The reinforcing member 120 may comprise merely a flexible fabric such as nylon or other strong material and in such event will serve merely to increase the tensile strength of the hinge-spring means 124 to support larger sized valve members or withstand greater flow velocities. Or, the reinforcing member 120 may comprise a metallic leaf type spring or other resilient, relatively stiff, material so as to increase the bias urging the valve member 116 onto the reinforcing portion 110, as will presently be described.

The hinge-spring means 124 is formed in substantially the same manner as previously described in connection with the hinge-spring means 28 and 62 of the valving devices 20 and 50, respectively, in that the body of material is formed in an elongated, tubular portion having a bore 128 extending therethrough, with one wall of the tubular portion severed for the entire length of the bore 128 to provide the hinge-spring structure. The annular band portion 126 is provided with an annular internal groove for receiving the retaining lip 112 formed on the reinforcing portion 110 so that the resilient ring may be slipped over the reinforcing portion 110 and retained in place. In particular, it will be noted that the downstream face of the annular band portion 126 extends beyond the downstream end 114 of the metallic reinforcing portion 110 to form an annular resilient seating surface 130. This assures that the valve member 116 will contact the seating surface 130 of the resilient band portion 126 prior to engaging the rigid reinforcing member 110 so as to instigate a low pressure and subsequently perfect a high pressure seal, as will presently be described, even though the metallic reinforcing members are not sufficiently mated to ever accomplish a seal.

Figure 8:
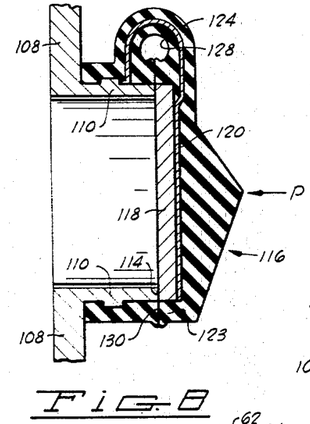
FIG. 8 is a longitudinal, partial sectional view of the valve of FIG. 7 illustrating the valve in the closed position and pressure loaded.

The operation of the valving device 100 is substantially the same as that of the valve 10 except for the manner in which the annular seal is formed between the valve member 116 and the seat member 127. When fluid is flowing in the direction of the arrow F, the valve member 116 will be swung away from the seat member 127 to the position illustrated in FIG. 7. As the flow subsides, the hinge-spring means 124 will return the valve member 116 toward the annular seat. The peripheral ring portion 123 around the reinforcing plate 118 will first engage the annular surface 130 to provide an initial seal between the valve member 116 and the seat member 127. Then as pressure is applied to the valve member 116 in the direction of the arrow P, the resilient material in the ring portion 126 and around the edges of the reinforcing plate 118 will be deformed until the reinforcing plate 118 contacts the end 114 of the tubular reinforcing portion 110, substantially as illustrated in FIG. 8, to form a pressure responsive seal. Any fluid leaking between the edges of the resilient material will form a hairline high velocity stream having a very low pressure. The resulting pressure differential between the low pressure and the higher pressure acting on the exposed surfaces of the resilient material will cause the resilient material to flow and seal the tiny opening through which the fluid is passing. Thus it will be appreciated that the reinforcing plate 118 need not be precisely mated with the end of the reinforcing portion 110 in order to accomplish a seal. Thus an effective seal is formed at low pressure due to the contacting of the resilient materials. As the pressure increases, the reinforcing plate 118 contacts the reinforcing portion 110 to effectively withstand the pressure loading on the valve member 116 and the reinforcing parts serve as a backup for the resilient material at the plane of contact between the reinforcing plate 118 and the reinforcing portion 110. Therefore, substantially any pressure can be checked until the resilient material extrudes between the abutting reinforcing members. By mating the reinforcing plate to the end of the tubular reinforcing portion, so as to prevent extrusion of the resilient material, very high pressures can be checked.

The method of manufacturing the valving device 100 entails the steps of fabricating the housing 102, which can easily be accomplished by molding the entire housing including the shoulder 108 and reinforcing portion 110 as a single unit and machining as required. Or, if desired, the reinforcing portion 110 may be machined separately and connected to the annular shoulder 108 in any suitable manner. The reinforcing plate 118 and the reinforcing member 120 may be disposed in the relative positions illustrated in FIG. 7 and the entire body of resilient material molded at the same time, so that the annular band portion 126 is integral with the peripheral ring portion 123 extending around the edges of the reinforcing plate 118 and the hinge-spring means 124. Of course the bore 128 may be easily formed during the molding process. Then a thin cutting tool may be used to sever the annular band portion 126 from the peripheral ring portion 123 to the bore 128 to form the annular sealing surface 130. The resilient ring portion 126 is then merely stretched around the reinforcing portion 110 and the construction will be complete.

Referring now to FIG. 9, another valving device constructed in accordance with the present invention is indicated generally by the reference numeral 150. The valving device 150 has a seat member indicated generally by the reference numeral 152, which is comprised of a substantially rigid reinforcing portion 154 and a resilient annular sealing lip portion 156 having an annular seating surface 158. The resilient sealing lip portion 156 is integral with a hinge-spring means 160 which is of the type previously described in that it is comprised of a generally tubular portion of resilient material 162 having an elongated bore 164 extending therethrough and is severed from the bore outwardly along one side.

A valve member, indicated generally by the reference numeral 166, is comprised of a substantially rigid reinforcing plate 168 and a mass of resilient material 170 which is bonded to the plate 168 and is integral with the hinge-spring means 160. The plate 168 is of substantially the same diameter as the outside diameter of the tubular reinforcing portion 154 and the resilient material 170 extends around the periphery of the plate 168 to form a peripheral sealing lip portion 172 having an annular face 174 for mating with the annular seating surface 158. It will be noted that in the position illustrated in FIG. 9, the plate 168 is spaced slightly from the downstream end 176 of the reinforcing portion 154 and that the annular seating surface 158 of the resilient sealing lip portion 156 tapers outwardly so as to engage the face 174 of the valve member 166 before the plate 168 contacts the reinforcing portion 154.

The operation of the valving device 150 is substantially the same as that of the valve 100. When fluid is flowing in the forward direction, i.e., passing through the seat member 152 from left to right when referring to FIG. 9, the valve member 166 will of course be swung upwardly and to the right as the hinge-spring means 160 flexes. When the flow tends to reverse, the valve member 166 will swing downwardly until the two annular resilient sealing surfaces 158 and 174 engage. Due to the relatively small area of contact between the surfaces, a relatively small pressure differential across the valve member 166 will quickly effect an annular seal. Additional pressure will deform the resilient material until the reinforcing plate 168 abuts the downstream end 176 of the rigid reinforcing portion 154. A very high pressure can then be checked because the contacting metal parts 154 and 168 will support the pressure load and also act as a backup seal for the resilient sealing lip portions 156 and 172, as previously described.

Manufacture of the valving device 150 can easily be accomplished using the method of the present invention. The reinforcing plate 168 and the reinforcing portion 154 are placed in a mold in substantially the positions illustrated. The mass of resilient material is then molded as a single piece in substantially the form illustrated and bonded to the metallic or relatively rigid reinforcing portions 154 and 168. The resilient material may enter between the downstream end 176 and the plate 168, or a disc may be inserted between the rigid members to exclude the material if desired. The bore 164 is preferably formed during the molding step but can be cut afterwards if more convenient. Next, a thin cutting tool is used to sever the body of rubber along the plane of the inner face of the plate 168 to form the annular face 174. The valve member 166 can then be swung away from the seat member 152 and the resilient material cut away from the downstream end 176 of the reinforcing portion 154 and along the tapered seating surface 158 of the sealing lip portion 156 to complete the construction. The seat member 152 may of course be inserted in the tubular housing such as the housing 12 or 102 by flaring or crimping, by threads, by a press fit, or by any other suitable manner. If desired, the reinforcing plate 168 may abut the end of the tubular reinforcing portion 154 in the mold. Then the end of the tubular reinforcing portion 154 can be cut away either by inserting a reaming tool through the tubular portion prior to severing the resilient material, or by freeing the valve member and then cutting the end of the tubular portion away.

Figures 10, 10A, 12, 12A, 13, 14, 15, 16:
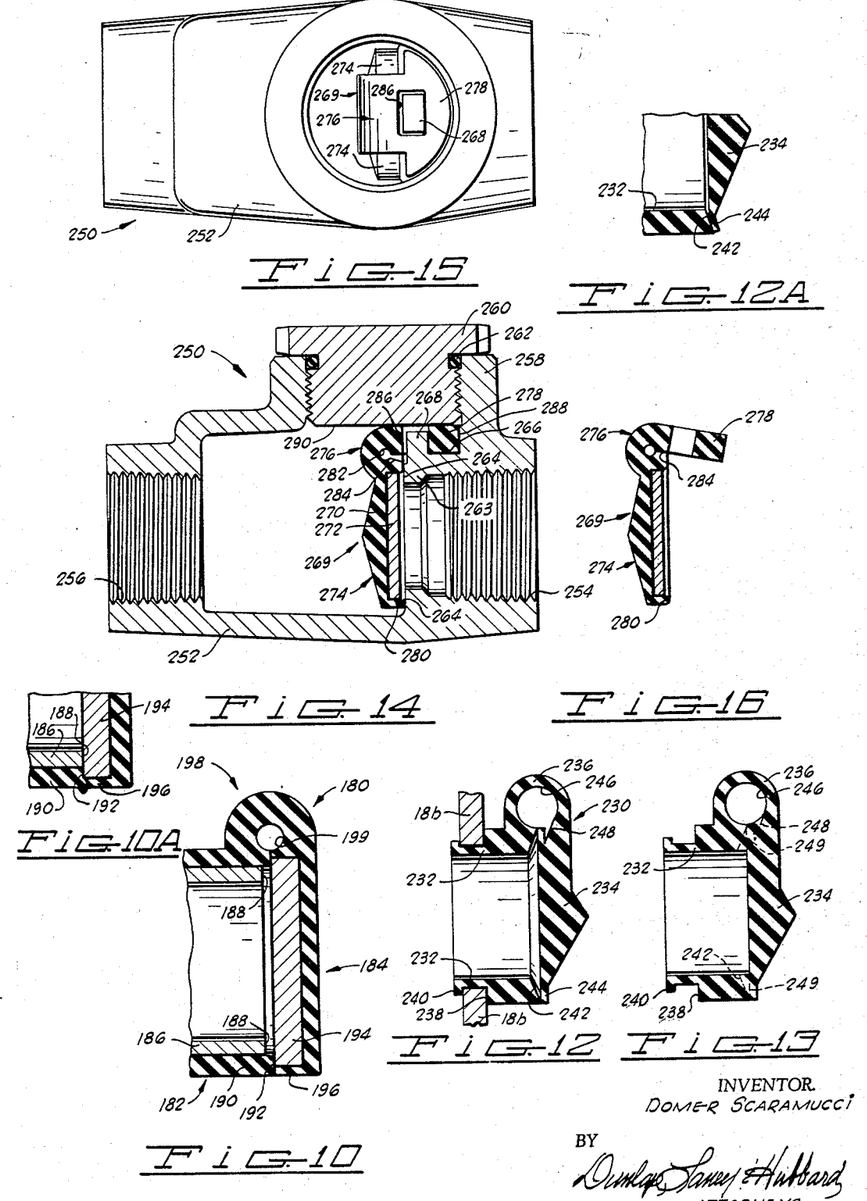

Referring now to FIGS. 10 and 10a, another valving device constructed in accordance with the present invention is indicated generally by the reference numeral 180. The valving device 180 is quite similar to the valving device 150 and is comprised of a seat member indicated generally by the reference numeral 182 and a valve member indicated generally by the numeral 184. The seat member 182 is comprised of a metallic or substantially rigid tubular reinforcing portion 186 having a downstream end 188 and a resilient ring portion 190 having an annular resilient seating surface 192. The valve member 184 is comprised of a metallic or substantially rigid reinforcing plate 194 which has a diameter somewhat larger than the outside diameter of the metallic reinforcing portion 186 but less than the maximum diameter of the ring portion 190, and therefore of the annular resilient seating surface 192. It will also be noted that the seating surface 192 protrudes outwardly further than the downstream end 188 of the rigid reinforcing portion 186 so as to insure that the plate 194 engages the resilient seating surface 192 prior to abutting the end 188, as will presently be described. The valve member 184 also includes a peripheral ring of resilient material 196 around the edge of the plate 194 which is preferably adapted to engage the seating surface 192 to assist in providing a pressure responsive seal, as will hereafter be described in greater detail. A resilient hinge-spring means, indicated generally by the reference numeral 198, is integral with the resilient material of the valve member 184 and the resilient material of the seat member 182 and is formed in substantially the same manner as the hinge-spring structures heretofore described, including an elongated bore 199 which forms a tubular body of resilient material split along one side and connected to both the seat member 182 and the valve member 184.

The operation of the valving device 180 is substantially identical to the operation of the valving devices heretofore described except for the operation of the seating surface 192. When fluid flows through the tubular seating member from left to right, when referring to FIG. 10, the valve member 184 will swing through an arc upwardly to the right to open the valving device. As the flow subsides, the hinge-spring means 198 will commence to return the valve member 184 to the seat member. When the flow tends to reverse the plate 194 will contact the annular seating surface 192 and almost immediately effect a low pressure seal. Any fluid passing between the surface 192 and the upstream face of the plate 194 will create a zone of reduced pressure such that the higher static pressure on the resilient material of the ring portion 190 will cause the resilient material to flow and close the opening between the surfaces. As the pressure builds, the plate 194 will be pressed downwardly until it abuts the downstream end 188 of the rigid reinforcing portion 186. At this point, the resilient material of the ring portion 190 will be subjected to longitudinal deformation so as to be firmly pressed against the surface of the plate 194 and against the resilient material 196 around the edge of the plate. Further, the resilient material of the ring portion 190 will remain in a pressure responsive relationship to both the plate 194 and the resilient material 196 so that any further increase in pressure augments the seal. However, since the plate 194 abuts against the downstream end 188, relatively high pressures can be checked because the abutting metallic or substantially rigid surfaces will provide a sufficient backup seal to retain the resilient material until the pressure becomes so great as to actually extrude the resilient material between the rigid members. Of course, very high pressures can be held if the downstream end 188 and the reinforcing plate 194 are mated to prevent extrusion of the resilient material.

Manufacture of the valving device 180 may be easily accomplished in accordance with the method of the present invention. The plate 194 and the reinforcing portion 186 may be placed in a mold with the plate 194 abutting against the end of the reinforcing portion 186. The body of resilient material may then be molded around the two rigid members. Next, a reaming or other metal cutting tool is inserted through the open end of the reinforcing portion 186 and the end of the portion cut away to form the downstream end 188 which is spaced from the plate 194. Then a thin cutting implement may be used to sever the resilient material along the upstream face of the plate 194 to form the annular resilient seating surface 192. Upon severance, the resilient material will contract radially inwardly along the inner face of the plate 194 so as to remain in substantially the same plane or to be slightly conical shaped and flared outwardly and downstream such that the outer periphery of the surface is the first to engage the valve member 184. Thus even though the portion 196 of the resilient material contracts longitudinally of the plate 194, so that the outer periphery pulls away from the surface 192, the surface 192 will still engage the periphery of the plate 194 and also the resilient material 196 before the plate 194 contacts the ends 188. Of course it will also be appreciated that a disc-shaped spacer could be inserted between the end of the reinforcing portion 186 and the plate 194 in the mold so as to form the space between the end 188 and the plate 194. The spacer can of course easily be removed when the resilient material is severed after molding, and can be used again.

Figure 11:
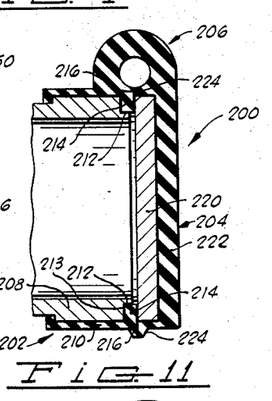
FIG. 11 is a longitudinal, partial sectional view of yet another valving device constructed in accordance with the present invention, the device being shown in closed position, but not pressure loaded.

Referring now to FIG. 11, another valving device constructed in accordance with the present invention is indicated generally by the reference numeral 200. The valving device 200 is similar to the valving devices heretofore described except for a novel annular sealing means which is both a compressive and pressure responsive type seal, as will presently be described. The valving device 200 is also comprised of a tubular seat member, indicated generally by the reference numeral 202, and a valve member, indicated generally by the reference numeral 204, which are interconnected by a resilient hinge-spring means, indicated generally by the reference numeral 206.

The seat member 202 is comprised of a metallic or other rigid tubular reinforcing member 208 and a ring of resilient material 210 which is integral with the hinge-spring means 206. The tubular reinforcing member 208 has an annular projection 212 extending downstream from the downstream annular face 213 thereof. The resilient ring portion 210 has an annular compression ring portion 214 disposed over the face 213 which extends downstream further than the projection 212 of the tubular reinforcing member 208. A peripheral lip portion 216 extends radially outwardly from the compression ring portion 214 to mate with a similar lip portion presently to be described.

The valve member 204 is comprised of a disc-shaped reinforcing plate 220 which has a diameter corresponding to the maximum diameter of the tubular member 208. A body of resilient material 222 conveniently encompasses the edges of the plate 220 and forms a peripheral lip 224 which is adapted to mate with the lip 216. The resilient material 222 is also integral with the hinge-spring means 206 which is in the tubular configuration heretofore described.

Except for the operation of the annular seal, the operation of the valving device 200 is substantially identical to the operation of the valving devices heretofore described. Thus if fluid flows from left to right, when referring to FIG. 11, in the forward direction through the tubular seat member 202, the valve member 204 will be swung in an arc upwardly to the right. When the flow subsides, the hinge-spring means 206 will bias the valve member 204 toward the seat member 202, and as the flow tends to reverse, the lip 224 will engage the lip 216 and almost immediately establish a pressure responsive seal even to the initial low pressure. As the pressure mounts, the pressure load on the valve member will force the plate 220 against the projection 212 of the tubular reinforcing member 208, thereby deforming the compression ring portion 214. Since the compression ring portion will then be confined on three sides it will to a large degree provide a compression type seal which will be augmented by the high pressure on the fourth side. Thus, the compressive sealing attained by reason of the natural tendency of the resilient material to retain its relaxed position is augmented by the pressure on the fourth side which also causes the resilient material to function as a pressure responsive or pressure augmented seal.

The valving device 200 can readily be manufactured in accordance with the method of the present invention merely by placing the plate 220 and tubular reinforcing member 208 in a mold in the desired spaced relationship as illustrated in FIG. 11. This spaced relationship can be attained by a disc-shaped spacer placed between the projection 212 and the plate 220, or the projection 212 may initially be sufficiently long to establish the desired relative positions and subsequently machined down to provide the spacing illustrated. After the body of resilient material has been molded around the two rigid members in an integral mass in the form illustrated, a thin cutting tool is used to separate the mass along the plane of the interior face of the end 212. If the disc-shaped spacer is used, it can easily be removed at this time. However, if the projection 212 is initially long enough to provide the spacing, the end of the projection 212 can more easily be machined away prior to severance of the resilient material by inserting a tool from the left-hand end of the tubular seat member 202, when referring to FIG. 11.

Referring now to FIG. 12, another valving device constructed in accordance with the present invention is indicated generally by the reference numeral 230. The valving device 230 is comprised of an integral body of resilient material comprised of a seat member 232, a valve member 234, and a hinge-spring means 236, all of the type heretofore described. The seat member 232 is generally tubular in character and the upstream end, i.e., the left-hand end when referring to FIG. 12, is of reduced diameter to form an annular shoulder 238 which faces upstream and bears the pressure load on the valving device. The very tip of the upstream end is provided with a radially outwardly projecting peripheral shoulder 240. The shoulder 240 is spaced from the shoulder 238 so as to receive the annular shoulder 18b of a housing similar to the housing 12 of FIG. 2. The downstream end of the tubular seat member 232 is conically tapered to provide an annular seating surface 242, as will presently be described.

Since no rigid reinforcing elements are used in the valving device 230, it will in many cases be desirable to employ a relatively stiff resilient material in order to withstand higher pressure loads. Therefore, the valve member 234 may be made substantially thicker at the center than at the edges so as to withstand higher pressure loads, and is also preferably provided with a relatively thin peripheral lip 244 of substantially the same diameter as the maximum diameter of the tubular sleeve 232 for mating with the annular seating surface 242. The hinge-spring means 236 is substantially identical to those previously described except that the bore 246 extending therethrough is of greater diameter so that the walls of the tubular sleeve will be slightly thinner to compensate for the stiffer material used to fabricate the valving device.

The operation of the valving device 230 is similar to the operation of the valving devices heretofore described. Thus when fluid is flowing from left to right through the tubular seat member 232, the valve member 234 will be swung generally through an arc upwardly and to the right as the hinge-spring means 236 flexes. As the fluid flow subsides, the valve member 234 will be swung back toward the seat member 232 by the resilient hinge-spring means 236 and upon contact of the peripheral sealing lip 244 with the annular seating surface 242 will form a fluid responsive seal. An increase in pressure will result in deformation of the annular lip 244 as illustrated in FIG. 12a until the thicker, stiffer portion of the valve member 234 engages the seat member 232. Since the lip 244 is relatively thin, it will be deformable responsive to fluid pressure whenever a hairline high velocity stream of fluid passes between the seating surface 242 and the lip 244 to create a low pressure area. Thus it will be appreciated that increased pressure augments the seal between the lip 244 and surface 242. By also severing the sealing lip 244 from the hinge-spring means 236 in the area 248, the fluid responsive seal can be better perfected around the entire periphery of the seat member 232.

The valving device can be easily and economically manufactured by means of the method of the present invention. The valving device is first molded in an integral mass having the longitudinal cross section as illustrated in FIG. 13, wherein the seat member 232, the valve member 234 and the hinge-spring means 236 are easily distinguishable. Next the mass of material is severed from the bore 246 along the dotted line 249 between the valve member and seat member to form the upstream face of the valve member 234. Next the valve 234 is swung away from the seat member 232 and the end of the tubular valve member 234 ground or otherwise cut down to form the seating surface 242 as indicated by the dotted line of FIG. 13. Next the lip in the area 248 may be freed from the hinge-spring means 236 to complete the peripheral sealing lip as desired.

Referring now to FIGS. 14, 15 and 16, another valving device constructed in accordance with the present invention is indicated generally by the reference numeral 250. The valving device 250 is comprised of a generally tubular housing 252 having internal threads 254 and 256 at the upstream and downstream ends, respectively. The housing 252 is also provided with an upstanding tubular neck 258 the axis of which is disposed generally at a right angle to the longitudinal axis of the housing. A plug 260 is threadedly inserted and sealed by an O-ring 262. An annular seating surface 264 is formed within the tubular housing 252 by a tubular seat member 263 and faces downstream. A generally planar guide surface 266 is formed above the seating surface 264 and faces the lower, or inner, end of the plug 260. A keeper 268 extends upwardly from the guide surface 266 and has a cross sectional configuration as can be seen in FIG. 15.

A body of resilient material 270 is bonded to a disc-shaped reinforcing plate 272 to form a valve member, indicated generally by the reference numeral 274. The valve member 274 has an annular sealing lip 280 which projects beyond the upstream face of the reinforcing plate 272 so as to engage and mate with the annular seating surface 264 before the plate 272 thus insuring a fluid tight seal. The body of resilient material also forms a hinge-spring means 276 which is of the same type previously described in that a mass of resilient material is provided with an elongated bore 282 which extends through the mass and forms an elongated tubular body which is separated along a severance plane 284. The mass of resilient material also has a tongue portion 278 for connecting the hinge-spring means 276 to the housing. The tongue portion 278 is provided with an aperture 286 for receiving the keeper 268 and is generally semicircular in shape, as can best be seen in FIG. 15, so as to be snugly received in the tubular neck 258 between the keeper 268 and the circular wall 288. The plug 260 is preferably of such a length that the inner end 290 will engage and clamp the tongue portion 278 between the plug 260 and the guide surface 266 and securely hold the valving device 269 in place within the housing 252 and promote proper operation, as will presently be described.

It will be noted that the guide surface 266 and the annular seating surface 264 are disposed at substantially 90 degrees in the embodiment illustrated, although this angle may vary as desired. The hinge-spring means 276 is preferably molded such that the tongue portion 278 and the upstream face of the valve member 274 are disposed at an angle less than 90 degrees or less than the angle between the guide surface 266 and the seating surface 264, substantially as illustrated in FIG. 16. Then when the mass of material forming the hinge-spring means is separated along the severance plane 284 and the valving device 269 secured in place in the housing 252 by tightening the plug 260 to clamp the tongue portion 278 between the plug 260 and guide surface 266, the hinge-spring means 276 will continually exert a bias on the valve member 274 tending to maintain the sealing lip 280 against the annular seating surface 264 and thereby insure sufficient contact to form a fluid seal.

The operation of the valve 250 is substantially identical to the operation of the valving devices heretofore described. When fluid flows in the forward direction through the tubular housing 252 from right to left, the valve member 274 will swing through an arc to the left and upwardly as the hinge-spring means 276 flexes. When flow stops, the hinge-spring means 276 will return the valve member 274 to the annular seat 264 in substantially the position illustrated in FIG. 14 such that a low pressure seal will be effected. As the back pressure increases and the pressure loading on the valve member 274 increases, the annular sealing lip 280 will be deformed until the disc-shaped reinforcing plate 272 abuts the annular seating surface 264. A substantial increase in back pressure can be checked due to the strength of the reinforcing plate 272, yet the annular sealing lip 280 will continually provide a pressure responsive seal between the reinforcing plate 272 and the annular seating surface 264. Therefore, the reinforcing plate 272 need not be mated with the seating surface 264 except to the extent necessary to prevent extrusion of the resilient material between the two rigid parts under high pressure.

From the above detailed description of the various aspects of the present invention, it will be evident to those skilled in the art that a novel and highly useful valving device and a method for economically manufacturing the same has been described. In FIGS. 1, 2 and 3, a very simple valve has been described which utilizes a novel combination hinge and spring device for supporting and biasing a metallic or substantially rigid valve member toward an annular seat. The hinge means, the seat, and the valve member are interconnected and form a complete valving device which can be economically manufactured and easily inserted in a single piece housing to form the completed valve structure. A novel method of manufacturing the hinge-spring structure and a novel method of manufacturing the valving device on an economical mass production basis have been described.

The form of the invention illustrated in FIGS. 4 and 5 employs a resilient compression type annular seal which eliminates the need for precision machining of the rigid reinforcing portions of the valve member and of the seat member, which may be very economically manufactured by the method of the present invention, and which will be very quiet in operation due to the fact that all abutting parts are of resilient material. The resilient hinge-spring means provides a friction free support for the swinging valve member and is so constructed as to greatly reduce the tensile stresses within the resilient material even when the valve is full open and the hinge-spring means is subjected to maximum flexure.

The valving device 100, shown in FIGS. 7 and 8, utilizes a novel construction wherein the housing and reinforcing portion of the seat member can be fabricated as one separate unit, the annular sealing means on the seat member, the hinge-spring means, and the valve member fabricated as another integral unit, and the two then easily assembled. In addition to forming an annular, fluid responsive sealing lip around the tubular reinforcing portion of the seating member, the ring of resilient material 126 also serves to connect the valve member and the hinge means to the seat member.

The valving device disclosed in FIG. 9 provides a fluid responsive seal around the swinging valve member that is augmented by increases in the fluid pressure being held and therefore constitutes what is termed in the art as a fluid responsive seal. The construction illustrated in FIG. 11 is the most sophisticated of the novel sealing lip structures disclosed and employs both pressure responsive sealing at the lips 214 and 224 and, to a large degree, compressive sealing of the resilient material 214 which is confined on three sides by metal members when the valve member is pressure loaded. This structure will effectively seal any pressure which will not result in failure of the metal parts or extrusion of the resilient material between the contacting metal parts. The embodiment of the sealing lip structure shown in FIG. 10 also discloses a pressure responsive sealing lip which is augmented by the force exerted on the valve member by the pressure being held.

Of course, all of the devices can be easily and economically manufactured in accordance with the method of the present invention. The valving device 250, disclosed in FIGS. 14, 15 and 16, embodies the advantages of the valves heretofore described and further has the advantage that the resilient valve member and hinge-spring means can readily be replaced without disconnecting the valve housing from the conduit in which it is installed simply by removing the plug 260. This construction also readily permits prestressing of the hinge-spring means so as to continually urge the valve member positively against the annular seating surface 264.

Having thus described several preferred embodiments of the invention in detail, it is to be understood that various changes, substitutions and alterations can be made in the parts and combinations thereof without departing from the spirit and scope of the invention as defined by the appended claims.

What is claimed is:

1. An improved swinging check valve comprising:
a tubular housing having a substantially rigid tubular seat portion disposed therein and extending downstream, the downstream end of the seat portion forming an annular face having an inside and an outside diameter;
a valve member for closing the seat portion having a substantially rigid disc portion of greater diameter than the inside diameter of the annular face; and
resilient hinge means interconnecting the valve member and the seat portion, the hinge means comprising a body of resilient material having a valve portion bonded to the rigid disc portion and a ring portion disposed around and connected to the seat portion, the body of resilient material being separated generally along a severance plane extending between the valve member and the ring portion, the severance plane forming the downstream end of the ring portion and being disposed downstream of the annular face of the rigid seat portion such that the valve member will first contact the resilient ring portion upon closing,
whereby the valve member will swing away from the seat portion responsive to forward fluid flow and will first contact the ring portion upon swinging back to the seat portion responsive to reverse fluid flow to form a fluid seal; and wherein
the resilient material of the ring portion extends over the downstream end of the seat portion and between the annular face of the seat portion and the disc portion to form a compressive type fluid seal.

2. An improved swinging check valve comprising:
a tubular housing having a substantially rigid tubular seat portion disposed therein and extending downstream, the downstream end of the seat portion forming an annular face having an inside and an outside diameter;
a valve member for closing the seat portion having a substantially rigid disc portion of greater diameter than the inside diameter of the annular face; and,
resilient hinge means interconnecting the valve member and the seat portion, the hinge means comprising a body of resilient material having a valve portion bonded to the rigid disc portion and a ring portion disposed around and connected to the seat portion, the body of resilient material being separated generally along a severance plane extending between the valve member and the ring portion, the severance plane forming the downstream end of the ring portion and being disposed downstream of the annular face of the rigid seat portion such that the valve member will first contact the resilient ring portion upon closing,
whereby the valve member will swing away from the seat portion responsive to forward fluid flow and will first contact the ring portion upon swinging back to the seat portion responsive to reverse fluid flow to form a fluid seal; and wherein
the annular face of the seat portion is further characterized by an annular projection facing downstream from said annular face and disposed adjacent the inner periphery of said face;
the disc portion has a maximum diameter substantially as great as the annular projection; and,
the ring portion extends between the annular face and the disc portion and extends further downstream than the downstream end of said projection to provide a combination pressure responsive and compression type seal.

3. An improved swinging check valve comprising:
a tubular housing having a substantially rigid tubular seat portion disposed therein and extending downstream, the downstream end of the seat portion forming an annular face having an inside and an outside diameter;
a valve member for closing the seat portion having a substantially rigid disc portion of greater diameter than the inside diameter of the annular face;
resilient hinge means interconnecting the valve member and the seat portion, the hinge means comprising a body of resilient material having a valve portion bonded to the rigid disc portion and a ring portion disposed around and connected to the seat portion, the body of resilient material being separated generally along a severance plane extending between the valve member and the ring portion, the severance plane forming the downstream end of the ring portion and being disposed downstream of the annular face of the rigid seat portion such that the valve member will first contact the resilient ring portion upon closing;
whereby the valve member will swing away from the seat portion responsive to forward fluid flow and will first contact the ring portion upon swinging back to the seat portion responsive to reverse fluid flow to form a fluid seal; and wherein the ring portion has a radially outwardly extending circumferential lip portion at the downstream end; and, the valve portion of the body of resilient material has a radially outwardly extending circumferential lip portion around the valve member for engaging and mating with the lip portion of the ring portion to form a pressure responsive seal.

4. An improved swinging check valve for a housing having a circular aperture therein, the check valve comprising:

a body of integrally molded resilient material having a seat member, a valve member and a hinge-spring means interconnecting the seat and valve members;

the seat member comprising a tubular portion having upstream and downstream ends, the upstream end being insertable in the circular aperture, a circumferential shoulder around the tubular portion and facing the upstream end for engaging the portion of the housing around the aperture and supporting the pressure load and forming a fluid seal, a conical seating surface on the downstream end of the seat member with the outer periphery thereof extending farther downstream;

the valve member having a disc-shaped portion for sealingly engaging the conical seating surface and having a relatively thin and flexible circumferential sealing lip therearound for engaging the outer periphery of the conical seating surface on the downstream end of the seat member and forming a fluid responsive seal therewith; and, the hinge-spring means comprising a body of material integrally connected with the valve member and seat member, the body having an elongated bore extending therethrough and disposed generally in the plane of the seating surface, the body being separated along a surface extending from the bore between the valve member and seat member;

whereby upon fluid flow through the tubular seat, the valve member will swing away from the seat member, and the valve member will swing back to the seat member responsive to cessation of forward flow and will check reverse flow.

5. An improved swinging check valve comprising:

a housing having tubular walls with a fluid inlet and a fluid outlet defining the upstream and downstream ends of the housing, a threaded opening in the tubular walls and a threaded plug having an inner end in the opening, an annular seating surface disposed generally in a plane and facing the downstream end of the housing, a guide surface disposed upstream from the annular seating surface at an angle to the annular surface and facing the threaded plug, a keeper member extending toward said plug and located between said guide surface and seating surface;

a valving device disposed in the housing and comprising a disc-shaped valve member for engaging the annular seating surface and checking reverse fluid flow, a tongue portion having an aperture receiving said keeper member disposed and held between the inner end of the threaded plug and the guide surface, and a hinge-spring portion interconnecting the valve member and the tongue portion comprising a body of resilient material having an elongated bore extending therethrough and being separated generally along a plane extending from the bore between the tongue portion and the valve member;

whereby the valve member will swing away from the seating surface responsive to forward fluid flow through the housing and will return to the seating surface and check reverse fluid flow.

6. An improved swinging check valve as defined in claim 5 wherein:

the angle between the tongue portion and the valve member when the resilient material of the hinge-spring means is relaxed is less than the angle between the seating surface and the guide surface;

whereby the hinge-spring means will bias the valve member toward and against the annular seating surface at all times.

7. An improved swinging check valve comprising:

a housing having tubular walls with a fluid inlet and fluid outlet defining the upstream and downstream ends of the housing, a threaded opening in the tubular walls and a threaded plug in the opening, an annular seating surface disposed generally in a plane and facing the downstream end;

a valving device disposed in the housing and comprising an integrally molded body of resilient material bonded by a valve portion thereof to a substantially rigid disc-shaped portion to form a valve member, the resilient material being disposed around the periphery of the disc-shaped portion and projecting therefrom to form an annular bead for sealingly engaging the annular seating surface, a tongue portion for connection to the housing, and a hinge-spring portion interconnecting the tongue portion and the valve member, the hinge-spring portion having an elongated bore extending there-through and being separated generally along a plane extending from the bore between the tongue portion and the valve member; and, means for connecting the tongue portion to the housing, whereby the valve member will swing away from the seating surface responsive to forward fluid flow through the housing and will return to the seating surface and check reverse fluid flow.

8. A method for manufacturing a swinging check valve of the type having a tubular seat member forming a generally planar, annular seating surface at one end, a disc-shaped valve member for sealingly engaging the seating face, and a resilient hinge means interconnecting one edge of the seating face and the tubular seat member, the method comprising the steps of:

positioning the valve member adjacent to the seating face;

molding a body of resilient material adjacent one edge of the valve member and adjacent one side of the tubular seat member to bond the body to the valve member and to the seat member and to form an elongated bore extending through the body generally in the plane of the seating surface; and, severing the body of resilient material generally along the plane of the seating surface from the elongated bore between the seat member and the valve member.

9. A method for manufacturing a swinging check valve of the type having a tubular seat member forming a generally planar, annular seating surface at one end and having a substantially rigid tubular reinforcing member, a disc-shaped valve member for sealingly engaging the seating face having a substantially rigid, disc-shaped reinforcing member of greater diameter than the inside diameter of the tubular reinforcing member, and a resilient hinge-spring means interconnecting one edge of the valve member and the tubular seat member, the method comprising the steps of:

placing the disc-shaped reinforcing member in abuttment against one end of the tubular reinforcing member in a position to cover the opening in the tubular reinforcing member;

molding a body of resilient material around the tubular reinforcing member and the disc-shaped member and forming an elongated bore extending through a portion of the resilient material, the bore being disposed generally in the plane of the junction between the abutting reinforcing members;

severing the body of resilient material from the bore between the reinforcing members such that the disc-shaped reinforcing member will swing away from the tubular reinforcing member; and, cutting the end of the tubular reinforcing member away until the resilient material molded therearound projects out past the end of the tubular reinforcing member to engage the valve member upon closing before the disc-shaped reinforcing member contacts the tubular reinforcing member.

10. A method for manufacturing a swinging check valve of the type having a tubular seat member forming a generally planar, annular seating surface at one end and having a substantially rigid tubular reinforcing member, a disc-shaped valve member for sealingly engaging the seating face having a substantially rigid, disc-shaped reinforcing member of greater diameter than the inside diameter of the tubular reinforcing member, and a resilient hinge-spring means interconnecting one edge of the valve member and the tubular seat member, the method comprising the steps of:

placing the disc-shaped reinforcing member in aligned spaced relationship to one end of the tubular reinforcing member;

molding a body of resilient material around the tubular reinforcing member and around the disc-shaped reinforcing member and forming an elongated bore extending through a portion of the resilient material, the bore being disposed generally in a plane extending between the end of the tubular reinforcing member and the disc-shaped reinforcing member; and, severing the body of resilient material generally along a plane extending from the bore between the reinforcing members such that the disc-shaped valve member will swing away from the tubular seat member and the resilient material along the severance plane will form an annular resilient seating surface for receiving the valve member before the disc-shaped reinforcing member contacts the tubular reinforcing member upon closing of the valve member.

11. The method for manufacturing a swinging check valve as defined in claim 10 further characterized by:

molding a portion of the body of resilient material between the disc-shaped reinforcing member and the end of the tubular reinforcing member, whereby an annular compressive type resilient seal will be formed between the end of the tubular reinforcing member and the disc-shaped reinforcing member.

12. A method of manufacturing a swinging check valve of the type having a tubular seat member, a disc-shaped valve member, and a resilient hinge-spring means interconnecting the seat and valve members, the method comprising:

molding a body of resilient material in the form of a tubular seat member portion and a disc-shaped valve member portion over one end of the seat member portion and a hinge-spring means portion at one side of the seat member portion and the valve member portion;

forming an elongated aperture through the hinge-spring means portion generally parallel to a tangent to the seat member portion;

severing the resilient material along the severance plane from the elongated bore between the seat member portion and the valve member portion to form a disc-shaped valve member and a tubular seat member having a downstream end facing the valve member which will serve as an annular seat for the valve member; and, removing a portion of the downstream end of the tubular seat member around the inner periphery thereof so that the valve member will first contact the outer periphery of the downstream end of the tubular seat member upon closing.

References Cited by the Examiner

UNITED STATES PATENTS

| | | | |
|---|---|---|---|
| 2,297,994 | 10/1942 | Vellinga | 137—525.3 X |
| 2,512,694 | 6/1950 | Stout et al. | 137—525.3 X |
| 2,526,331 | 10/1950 | Copping | 137—525.3 X |
| 2,896,840 | 7/1959 | Hendry | 137—525.3 X |
| 2,906,281 | 9/1959 | Pillote | 137—525.3 X |
| 2,923,317 | 2/1960 | McInerney | 137—527.2 |
| 2,926,686 | 3/1960 | Gheen | 137—525 X |
| 2,981,282 | 4/1961 | Mack | 29—157.3 X |
| 3,128,785 | 4/1964 | Krummel | 137—525.3 X |
| 3,133,696 | 5/1964 | Mirando | 137—525 X |
| 3,152,608 | 10/1964 | Morrison et al. | 137—525.3 X |

JOHN F. CAMPBELL, *Primary Examiner.*

J. D. HOBART, *Assistant Examiner.*